United States Patent [19]
Funk

[11] Patent Number: 4,488,797
[45] Date of Patent: Dec. 18, 1984

[54] APPARATUS FOR CONTROLLING THE FLOW OF WATER TO A DIAZO PRINTER

[75] Inventor: Roger S. Funk, Holicong, Pa.

[73] Assignee: R. Funk & Co. Inc., Doylestown, Pa.

[21] Appl. No.: 375,654

[22] Filed: May 6, 1982

[51] Int. Cl.[3] .................... G03B 7/00

[52] U.S. Cl. .................... 354/298; 354/300; 354/319; 355/27

[58] Field of Search .................... 354/300, 298, 319, 324; 355/27, 100, 106; 417/44

[56] References Cited

U.S. PATENT DOCUMENTS 3,763,758 10/1973 Manack et al. .................... 354/298
4,057,818 11/1977 Gaskell et al. .................... 354/324
4,200,496 4/1980 Stein .................... 354/300

*Primary Examiner*—A. A. Mathews
*Attorney, Agent, or Firm*—Albert L. Free

[57] ABSTRACT

The supply of water to a diazo printer is varied in relation to the speed of operation of the printer by deriving a train of pulses recurrent at a repetition rate proportional to printer speed, applying the pulses to an adjustable digital divider which divides down the repetition rate by an adjustable divisor D, and applying the divided-down pulse train to a water pump to control the rate of water supply. Switching means are provided in the divider to enable adjustment of the valve of the divisor D. This permits adjustment of the absolute rate of water delivery for any given motor speed, after which the rate will automatically change in proportion to printer speed.

9 Claims, 2 Drawing Figures

APPARATUS FOR CONTROLLING THE FLOW OF WATER TO A DIAZO PRINTER

BACKGROUND OF THE INVENTION

Diazo printers have been known for many years, and are especially effective for producing high-accuracy whiteprints from original materials to be printed. In such printers, a sheet of printing paper and an overlying sheet of original material to be printed are conveyed by a motor-driven roller system through a position in which they are exposed to ultra-violet radiation from a suitable ultra-violet lamp, after which the original document and the copy paper are separated from each other; the original is returned to the machine user, while the copy paper is moved, again by the motor-driven roller system, through a developer chamber in which it is exposed to a mixture of ammonia and water vapor. Upon exit from the developing chamber, the copy paper carries an accurate reproduction of the information contained upon the original copy.

In such a system it is important to provide the proper proportion of water vapor mixed with ammonia gas in the developing chamber, or else proper image development may not occur. The water vapor is produced by an evaporator, supplied with water from a suitable water source or from aqua ammonia, and the evaporator is provided with a suitable thermostatically controlled heater operating in response to a temperature sensor within the evaporator, arranged so that, over a period of time, the amount of moisture evaporated into the developer chamber is substantially the same as the amount of water supplied to the evaporator from the water source. Accordingly, in order to maintain the desired water-vapor concentration in the developer chamber, it is desirable to supply water to the evaporator at the corresponding desired rate, and it has been found that the optimum amount of water vapor and thus water depends upon the type of reproducing paper used.

In the past it has also been recognized that it is desirable for many purposes to vary the rate of delivery of water to the evaporator as a function of the speed of the motor which moves the copy paper through the machine. Thus when the machine runs more rapidly, so that more footage of print paper per minute passes through the developer, a greater rate of delivery of water vapor and hence of water to the evaporator, is desired. In the past this has been accomplished by manual adjustment of a water supply valve, or automatically by means of an arrangement of multi-lobe cam switches mechanically coupled to the motor drive system, each lobe of any selected one of the cam switches serving to close an electrical circuit periodically and operate a solenoid pump to meter a predetermined quantity of water into the evaporator. Each multi-lobe cam switch produced an increasing rate of water supply to the evaporator as the motor speed increased, and by using different numbers of lobes on the different cams, one was able to select the absolute rate of flow of water into the evaporator for any motor speed.

While satisfactory for certain purposes, the latter types of arrangement have proved to be rather bulky, expensive, and less versatile than is desirable for many purposes.

Accordingly, it is an object of the invention to provide an improved diazo printer.

Another object is to provide an improved system for controlling the rate of delivery of water to the water evaporator as a function of the speed of the drive motor of a diazo printer.

Another object is to provide such a system in which the rate of water delivery at any given motor speed can be manually adjusted.

It is also an object to provide such an improved system which is of high accuracy, versatile, and relatively inexpensive.

SUMMARY OF THE INVENTION

In accordance with the invention, transducer means are provided which respond to operation of the printer motor to produce a train of electrical signals (preferably rectangular electrical pulses) at a repetition rate which varies directly with the motor speed; such a device may typically be a photoelectric arrangement operating in conjunction with an apertured disc rotating with the motor shaft, or a reluctance type pick-up positioned adjacent the path of travel of the teeth of a gear mounted on the motor shaft, as examples. The train of pulses is supplied to a settable binary digital divider device which responds to pulses from the transducer and produces corresponding output pulses at a selected submultiple of the repetition rate of the transducer pulses, the submultiple being selected by setting of switch elements associated with the binary divider. The pulses at the divided-down rate then operate a pulse-responsive water pump, such as a solenoid-operated pump of conventional form, to deliver metered quantities of water from the water source to the water evaporator at a rate proportional to the repetition rate of the output pulses to the pump.

Accordingly, with this arrangement the rate at which the pulses are applied to the water pump varies in proportion to the motor speed in any of the set conditions of the binary divider, but the proportionality factor, and hence the absolute rate of delivery of water to the evaporator for any given motor speed, is determinible and set by the particular condition in which the binary divider is manually set.

The arrangement described is highly accurate yet extremely small and inexpensive, and is at the same time highly versatile in that any of a large number of divisors may be utilized despite the inexpensive nature and small size of the components utilized.

BRIEF DESCRIPTION OF FIGURES

Other objects and features of the invention will be more readily understood from a consideration of the following detailed description, taking with the accompanying drawings, in which.

DETAILED DESCRIPTION OF PREFERRED EMBODIMENTS

Figure 1:
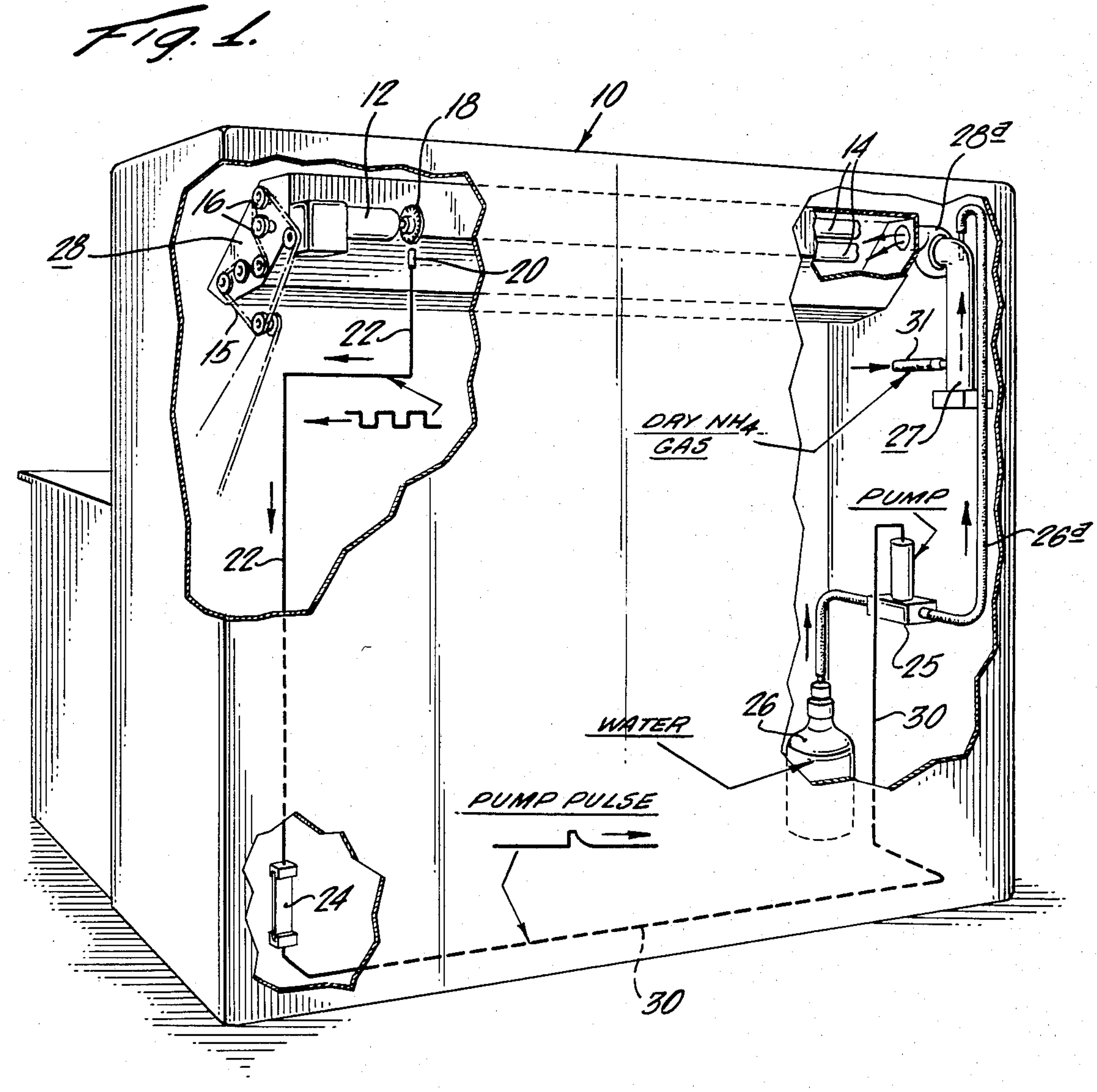
FIG. 1 is a schematic perspective view of a diazo printer employing the invention, as viewed from the rear.

Referring now to the embodiment of the invention illustrated by way of example in the drawings, the diazo printer 10 includes a drive motor 12 which drives the developer rollers 14 to convey the printing paper through the machine, by means of an appropriate drive chain 15 and sprockets such as 16. A steel timing gear 18, driven by motor 12, turns at the motor speed, or, if driven through intermediate gears, at a different speed bearing a known relationship to motor speed. An electromechanical transducer in the form of a reluctance pick-up 20 is positioned adjacent the periphery of gear 18, so that each time a tooth of gear 18 passes reluctance pick-up 20, an electrical pulse is induced in line 22 extending from the transducer to the printer-control circuit board 24. Other forms of pick-up devices known in the art may be utilized, for example a photocell-light source pick-up, the effect of its operation in any event being to produce on line 22 a train of generally rectangular pulses at a repetition rate proportional to the rotational speed of the motor 12.

It is the function of the electrical system embodied in circuit board 24 to receive this train of pulses from the pick-up 20 and derive therefrom a corresponding train of pump-actuating pulses occurring at a repetition rate which is an integral submultiple of the repetition rate of the train of pulses from the electromechanical transducer, and to apply the latter divided-down pump-actuating pulses to the solenoid pump 25 so as to pump water from water source 26 to water evaporator 27 at a rate proportional to the repetition rate of the divided-down pump-actuating pulses. The evaporator, suitably heated, receives the pumped water, and ammonia gas from line 31, and delivers the resultant mixture of ammonia and water vapor to the developer chamber 28, with the aid of a blower 28A.

It will be appreciated that the speeds at which the diazo machine may be run vary over quite wide ranges, typically from about 5 to 60 feet of copy per minute, the rate typically being set at the highest rate compatible with obtaining satisfactory printing of the type of medium used for the original material; because of wide differences in the original material, it is important to be able to adjust the printing speed over the wide range indicated. However, at any given printing speed, the rate of water delivery desired depends upon the type of copy paper being utilized; for some purposes, a so-called "wet" developer chamber is desired, corresponding to a relatively high rate of delivery of water to the evaporator, and for other types of copy paper a much drier developer environment may be desirable. To accommodate these differences, the electronic circuitry includes manually-settable switch means which can be set to different states so as to change the divisor by which the repetition rate of the speed sensor pulses is divided, and thus change the rate of water delivery produced at any given motor speed.

As an example, if a "wet" developer environment is desired, one may set the switches so that division by 256 occurs. If on the other hand, substantially less moisture is desired in the developer chamber, the repetition rate of the pulses from the speed-pickup transducer 20 may be divided by a factor of 1,024 by setting the switch elements in another set of states. This will result in a 4-times lower rate of delivery of water to the evaporator, at any given motor speed, than for the previously-described case in which the divisor was 256.

In a typical application of the invention, the repetition rate of the pulses from the transducer 20 may be variable from about 200 to about 3,000 pulses per second, and the divisors provided by the binary switch may be set anywhere between 256 and about 8,000.

Figure 2:
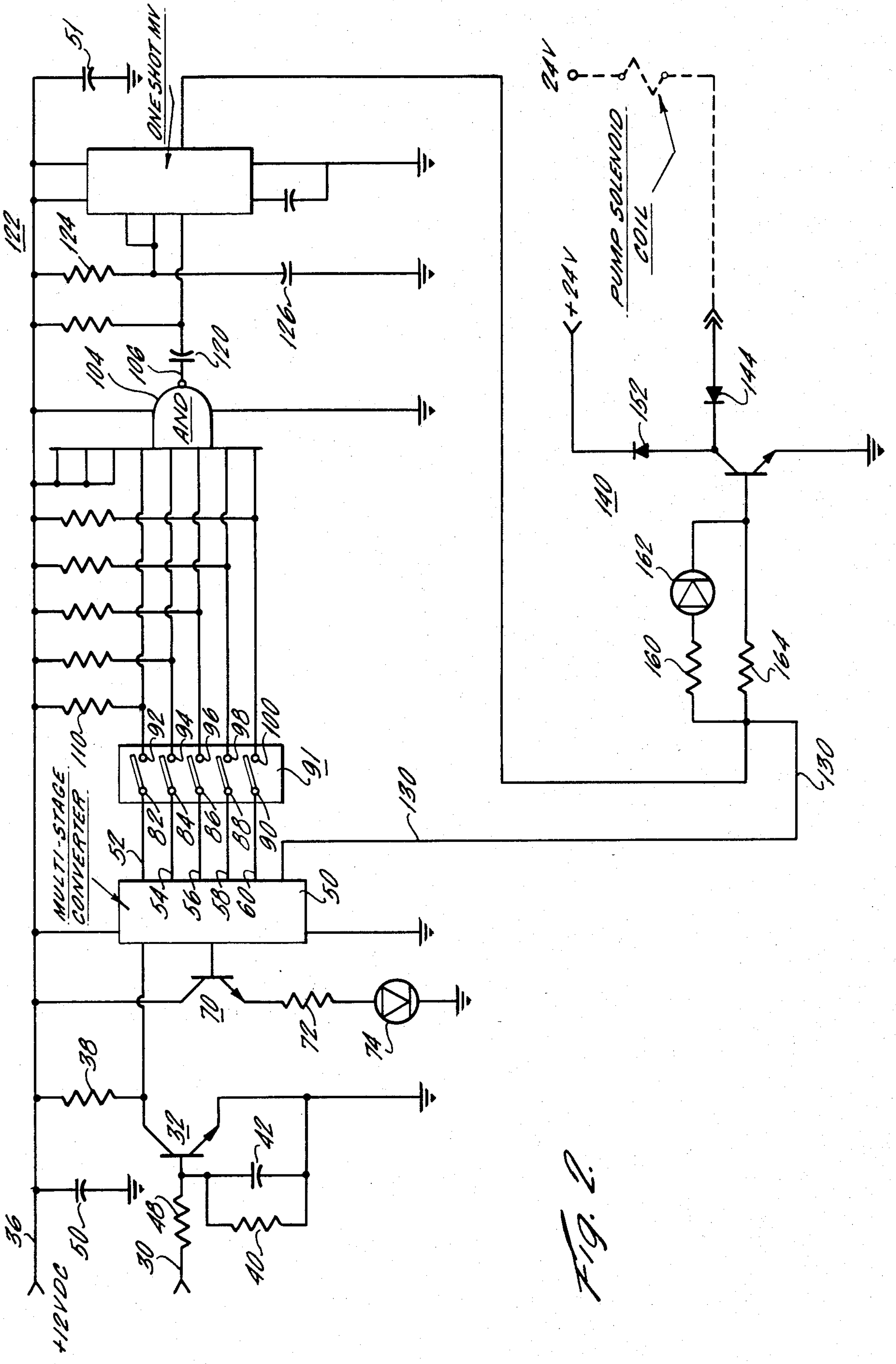
FIG. 2 is an electrical circuit diagram showing a preferred electronic circuit arrangement for practicing the invention in one of its forms.

Referring now to the electrical schematic diagram of the printer control board shown in FIG. 2, the train of pickup pulses from pickup 20 is supplied over line 22 (FIG. 1) to the input line 30 of a transistor stage 32 which serves as a level shifter to adjust the d.c. level of the train of input pulses to the 12-volt supply level of the circuit on the printer control board. As an example, transistor 32 may be a Type 2N4401 NPN transistor, the emitter of which is grounded and the collector of which is connected to the 12-volt supply line 36 by way of a collector load resistor 38, which may have a value of 10,000 ohms in this example. A conventional base resistor 40 connects the base of the transistor to ground, and is bypassed by a noise-suppressing capacitor 42. Base series resistor 48 serves to preserve a high impedance for current into the base of the transistor. Supply line 36 is bypassed to ground by capacitors 50 and 51, to eliminate noise interference. It will be understood that first transistor stage 32 is in itself conventional in design.

The collector output terminal of stage 32 is connected to the counter input terminal of a 12-stage counter 50, which may be a commercial Type CD4040 connected between supply line 36 and ground to provide it with appropriate supply voltages. While in this example the counter is a 12-stage counter, only the outputs from its five most significant counter stages are provided on its five output lines 52, 54, 56, 58 and 60. Thus, in this example, the latter five leads will indicate, respectively, a 0 or 1 (a Low or a High) whenever those counter stages which produce counts of 256, 512, 1,024, 2,084 and 4,096 are full. As a convenience in this embodiment, an indicator arrangement is preferably provided to indicate that the counter is receiving input pulses and operating appropriately; in this example, the indicator circuit comprises a transistor 70, the emitter-to-collector path of which is connected, in series with a resistor 72 and a LED device 74, between supply voltage and ground. The base of transistor 70 is connected to a relatively low-count output of the counter 50, so that each time this low-count is achieved by the counter, the LED device will flash.

The five output lines 52–60 of the counter 50 are supplied respectively to the input terminals 82, 84, 86, 88 and 90 of a commercial type of DIP switch 91 (wherein DIP indicates Dual Inline Package) such as the Type S27. This DIP switch has corresponding respective output switch terminals 92, 94, 96, 98 and 100, and five respective manually-actuatable switch arms which can be operated to connect or disconnect each pair of switch input and output terminals to or from each other, at will.

The output terminals 92–100 of the DIP switch are connected to five separate corresponding input terminals of an 8-input AND gate 104, which may be a commercial Type CD4068 AND gate, with its supply terminals connected to the supply line and to ground, as shown. In this example, three of the AND gate input terminals are not utilized, and hence are connected together and to the positive supply line, so as to always produce a High input to the AND gate. The signal level on the output line 106 of the AND gate remains High unless all of the inputs to the AND gates are simultaneously High, in which case its output goes Low.

The five active input terminals of AND gate 104 are connected through respective resistors such as 110 to the positive supply, so that when all of the switch arms of the DIP switch are open, each of the AND gate input terminals is High. A suitable value for each of these resistors is 10,000 ohms. When one or more of the switches of the DIP switch are closed, the output of counter 50 holds the corresponding input to the AND gate at a Low or 0 state until the corresponding stage of the counter attains a full count and thus goes High, at which time the corresponding input terminal of the AND gate will go High. Thus, for example, if only the switch arms corresponding to the 2,048 and 4,096 stages of the counter are closed, the AND gate 104 will be operated, and its output wll go Low, only when the 2,048 and 4,096 outputs of the counter are High, i.e. when the count reaches 6,144. By suitable selection of which switch arms of the DIP switch are closed, the AND gate can therefore be made to operate upon the achievement by the counter of any count which is the sum of the full counts to those counter stages which are connected to the switches which have been closed.

It will be appreciated that since the output of the AND gate goes Low only when a certain count, determined by the particular combination of switches closed by the operator, is achieved, the repetition rate at which the output of the AND gate goes Low is equal to the repetition rate of the pulses from the speed sensing pickup divided by the sum of the counts corresponding to the switches which are closed. Accordingly, by appropriate closing of different combinations of the switches, the repetition rate can be divided by any of a large number of divisors.

The output of the AND gate 104 is coupled through a capacitor 120 to a one-shot multivibrator circuit 122, the basic element of which is a conventional Type 555 one-shot. The duration of the pulse produced by the one-shot multivibrator is determined by the values of resistor 124 and capacitor 126; the other connections of input resistance and bypass capacitor shown in FIG. 2 are standard for such devices.

The output of the one-shot 122 is supplied back over lead 130 to the reset terminal of counter 50, so that once the count selected by the setting of the DIP switch has been achieved and the AND gate actuated, the counter is reset so as to repeat the above-described counting process and to produce subsequent pulses at the selected divided-down repetition rate from the one-shot multivibrator 122.

The output of the one-shot is also supplied to an output driver stage 140, which may comprise an NPN transistor Type T1P29 connected in the grounded-emitter configuration; the collector of the transistor is connected through a diode 144 to the solenoid of the liquid pump, the other terminal of which solenoid is connected to a positive supply voltage preferably 24 volts d.c. Stage 140 may be of conventional form for a solenoid driver, including in this example the diode 144 in series with the solenoid and the diode 152 connected between the transistor collector and the local 24-volt supply voltage, to protect the transistor from transient pulses fed back from the solenoid due to its reactive nature. A series combination of a resistor 160 and an LED device 162 may be connected in parallel with an input resistor 164, so that the LED will flash each time a pulse is delivered to the water pump as a convenient indication of operation.

As examples of the different humidity conditions often found desirable in the developer chamber, depending upon the reproducing material used, with blueline paper the interior of the developer chamber is preferably dry; with blackline paper it is preferably moist; with blackline Mylar reproducing material it is preferably medium dry; and with sepia paper it is preferably medium-dry. In any given installation of the printer for use with a particular reproducing medium, the setting of the switch means determining the pulse repetition rate divisor is preferably optimized by changing the switch settings until best printing results are obtained over the expected range of printing speeds.

In the particular embodiment described above in detail, it is assumed that the ammonia gas is introduced in dry form and the water introduced separately, into the evaporator. However, in some cases the water and ammonia may be introduced together in the form of aqua ammonia, in which case the pulse-controlled water pump is used to pump the water-containing aqua ammonia rather than pure water, in which case the switch settings may be different but the structure and operation are the same or substantially the same. Thus where pumping of water is referred to herein, it will be understood that this covers and includes pumping of aqua ammonia.

The solid-state circuitry preferably uses CMOS implementation, and the durations of the pump pulses supplied to the solenoid are preferably about 250 milliseconds in duration. Desirable flow rates for either water or aqua ammonia are typically about 16–18 c.c./minute maximum and about 2–3 c.c./minutes minumum.

Accordingly, there has been described a system for controlling the supply of water to the evaporator of a diazo printer by sensing the speed of the motor driving the printer to produce a train of electrical pulses representative of such speed, dividing the repetition rate of these pulses by a factor selectible by means of the manual setting of a binary divider device, and applying the divided-down pulses to a solenoid pump to control the rate of supply of water to the evaporator. The apparatus utilized for this purpose may be extremely small, light, compact and relatively inexpensive, while still providing a high degree of accuracy and versatility in operation.

It will be appreciated that in some applications the setting of the switch means may not be accomplished manually, but may be done electrically in response to an operator's signal, and/or automatically in response to preprogrammed instructions in the machine.

Although the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

What is claimed is:

1. Apparatus for use with a diazo printer of the type comprising a developer chamber, an evaporator, a pulse-responsive water pump for supplying water to said evaporator and a motor for moving copy paper through said developer chamber, said apparatus serving to control the actuation of said pump to supply water to said evaporator at a rate related to the speed of said motor and comprising:

transducer means responsive to operation of said motor for producing a train of electrical pulses having a repetition rate proportional to said motor speed;

digital electronic divider means responsive to said train of pulses for producing output pulses at a rate which is equal to said repetition rate of said train of pulses divided by an integral divisor having a value D, said divider means comprising manually-settable switch means for enabling manual setting of the said value of said divisor D; and means for supplying said output pulses to said pulse-responsive pump to actuate it once for each output pulse supplied to it.

2. The apparatus of claim 1, wherein said switch means comprises a set of manually-operable two-position switches.

3. The apparatus of claim 1, wherein said transducer means comprises an electro-mechanical speed sensor.

4. The apparatus of claim 1, wherein said transducer means is a photo-electric speed sensor.

5. The apparatus of claim 1, wherein said pulse-responsive water pump is a solenoid-actuated pump, and said output pulses are supplied to the actuating solenoid of said pump.

6. The apparatus of claim 2, wherein said set of switches comprises five switches.

7. The apparatus of claim 1, wherein said divider means comprises counter means for repetitively counting pulses of said train and for producing one of said output pulses each time the count in said counter means reaches a predetermined value equal to D.

8. The apparatus of claim 7, wherein said counter means comprises a multi-input AND gate and a multi-stage counter, and said manually-settable switch means are connected respectively between different stages of said counter and different input terminals of said AND gate, whereby said AND gate changes its state when all of the counter stages connected to those of said switch means which are closed first attain their full states.

9. Apparatus for controlling the rate of delivery of water from a water source to a water evaporator in a diazo printer by means of a solenoid actuated water pump, in response to changes in the rate of passage of copy paper through the printer, comprising:

means for sensing the rate of passage of copy paper through the printer and for producing a train of signals representative of such speed;

means responsive to said train of pulses for producing other electrical pulses at a repetition rate which is a submultiple of the rate of pulses from said speed sensor;

switch means for changing said submultiple; and means for supplying said other electrical pulses to said pump to actuate it in response to each pulse supplied to it.

* * * * *